UNITED STATES PATENT OFFICE.

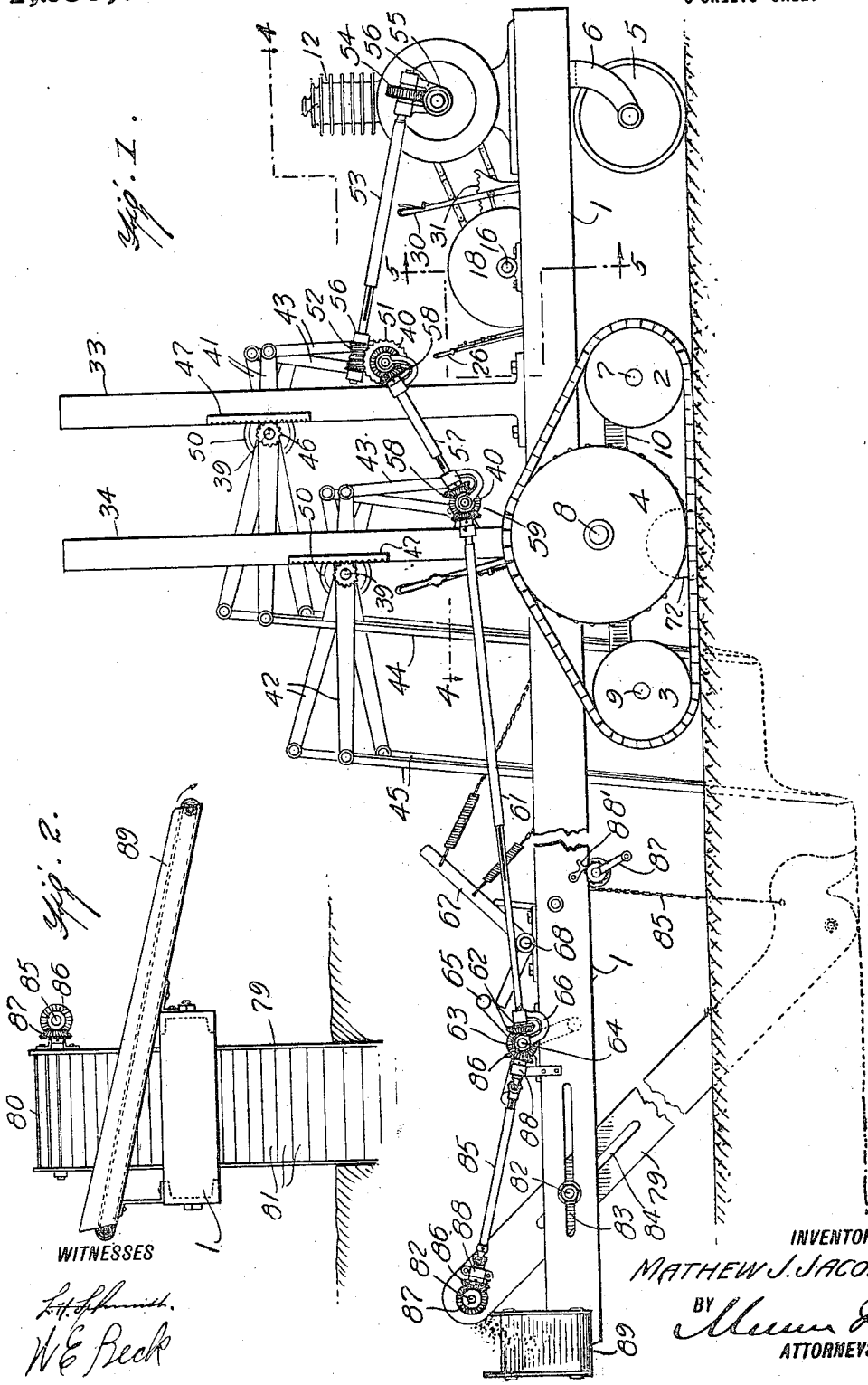

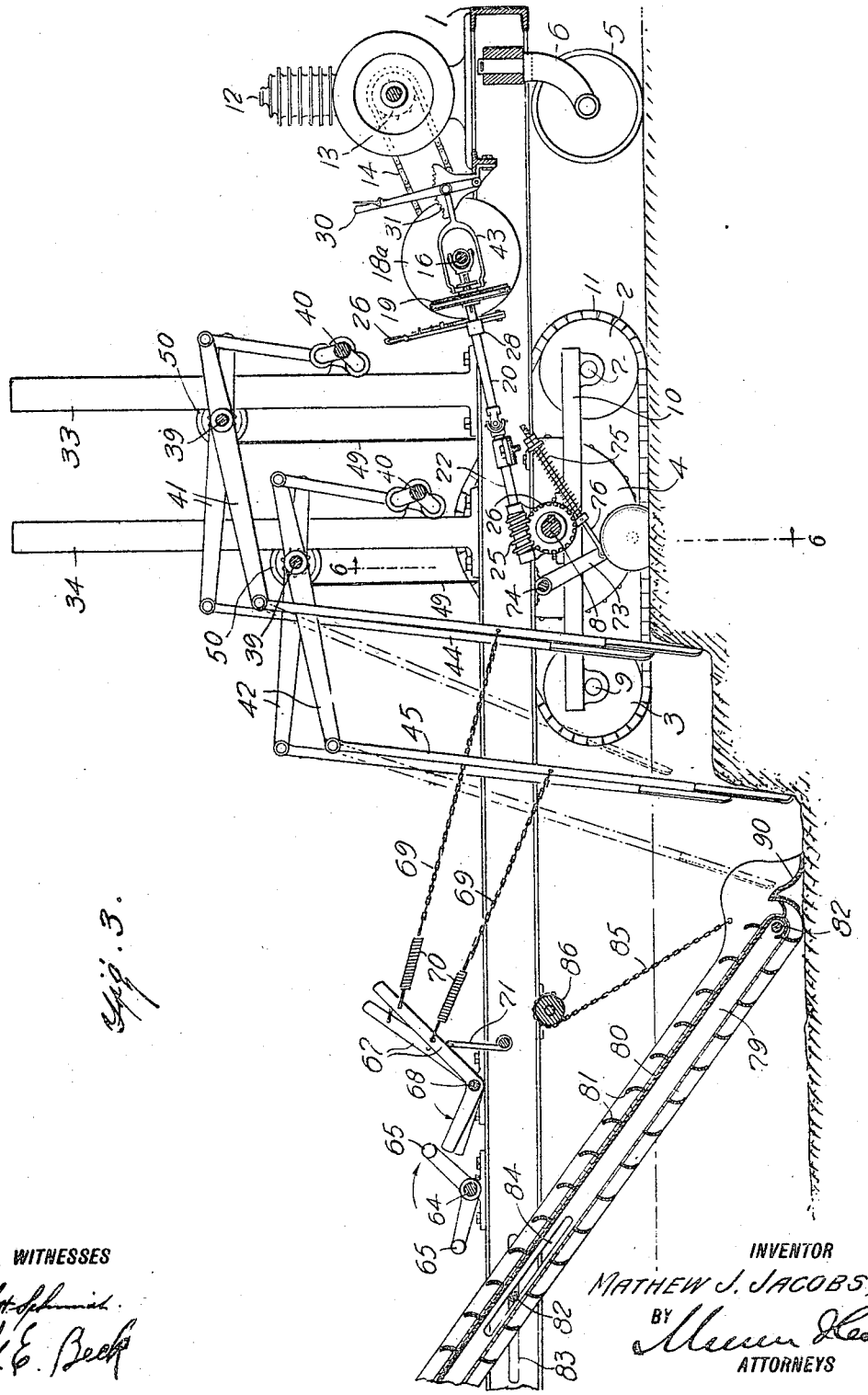

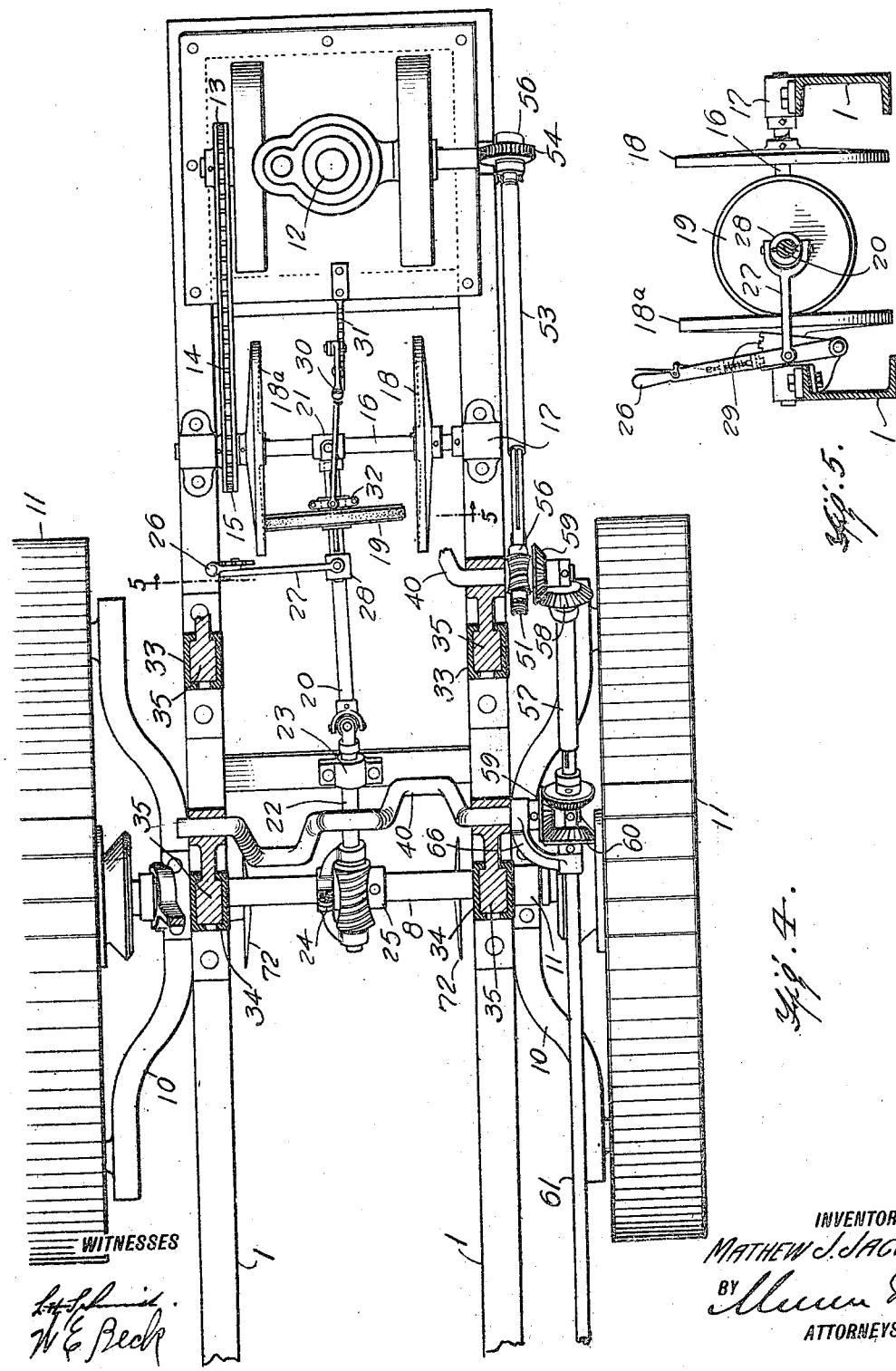

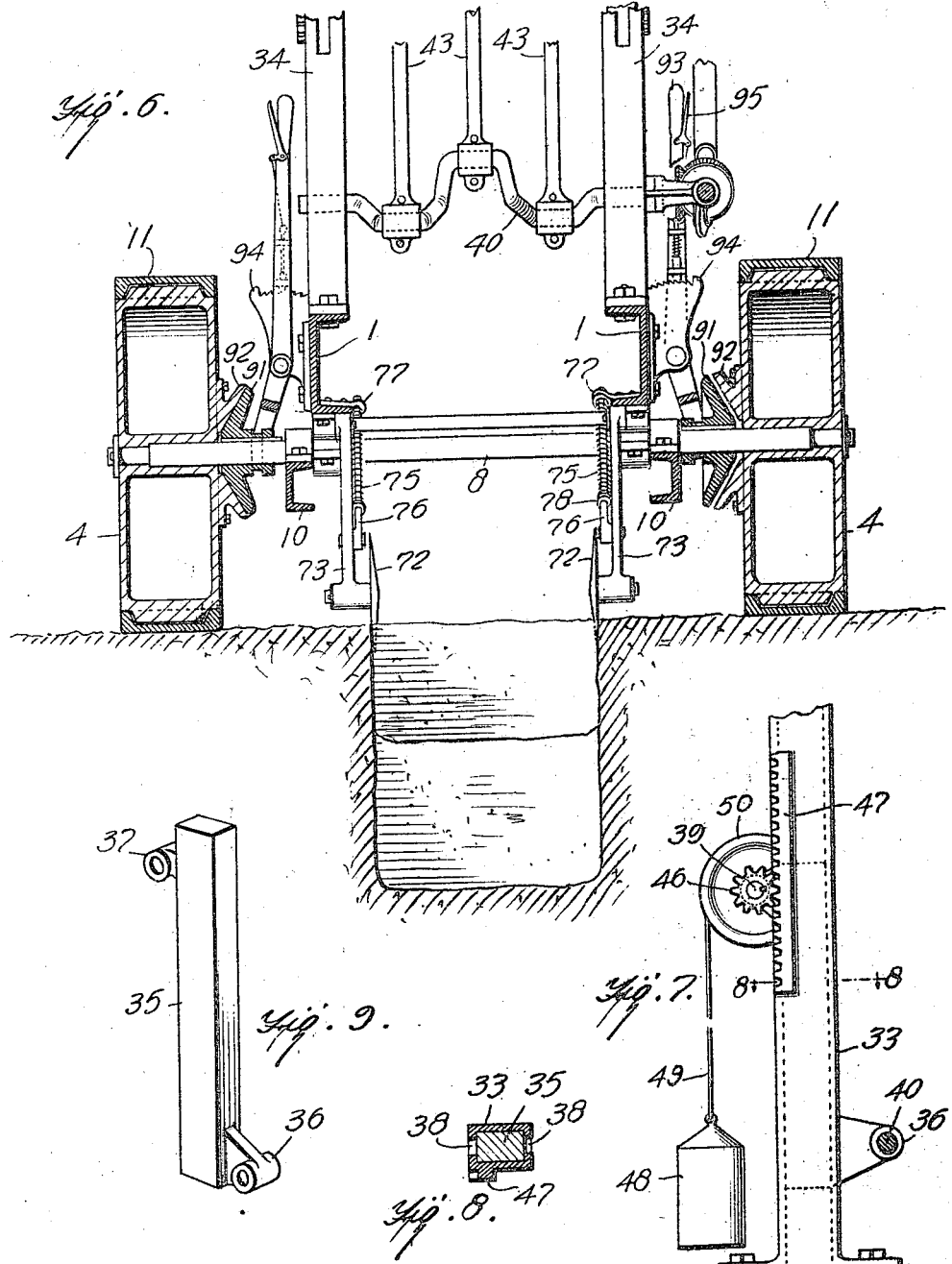

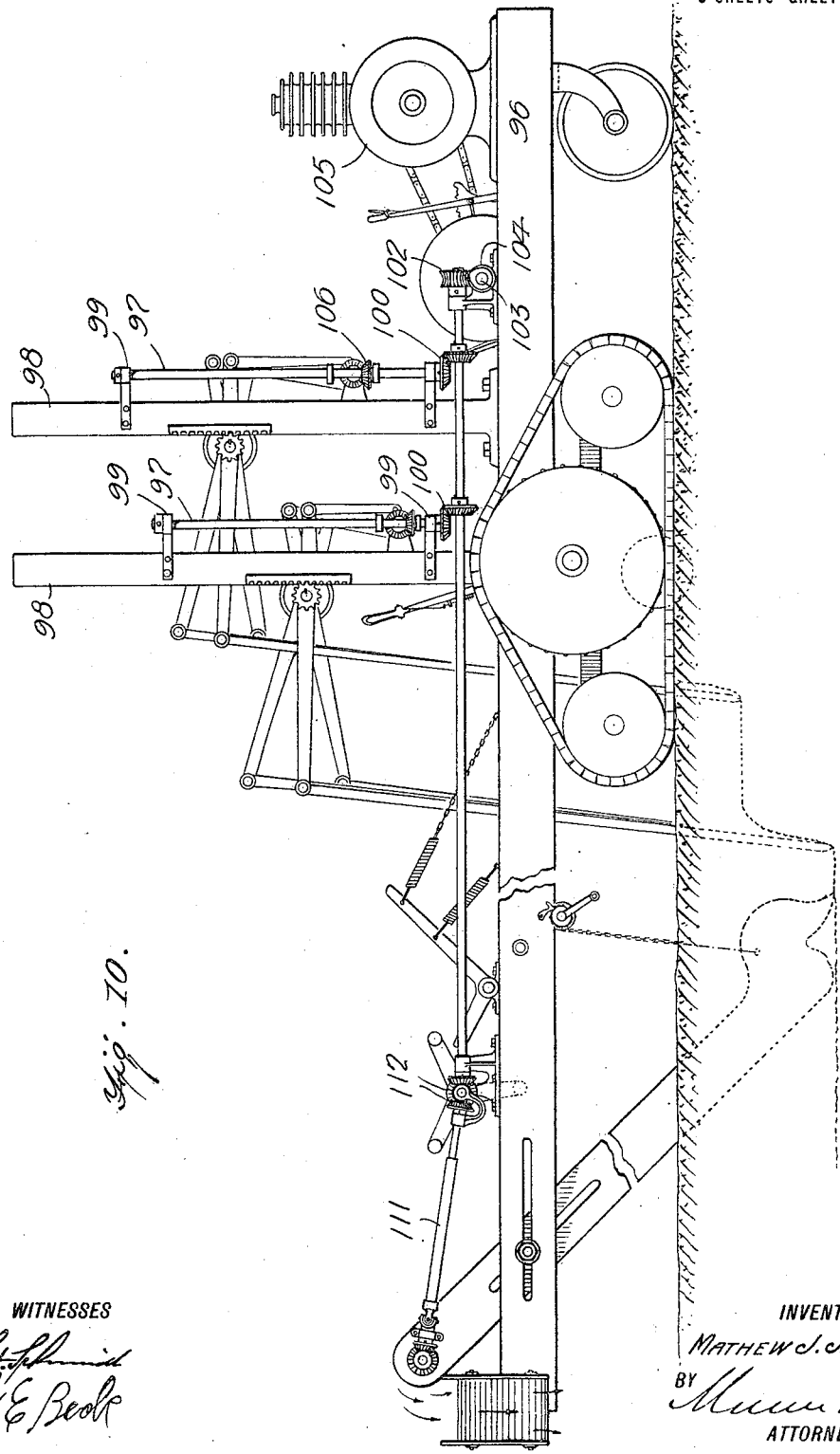

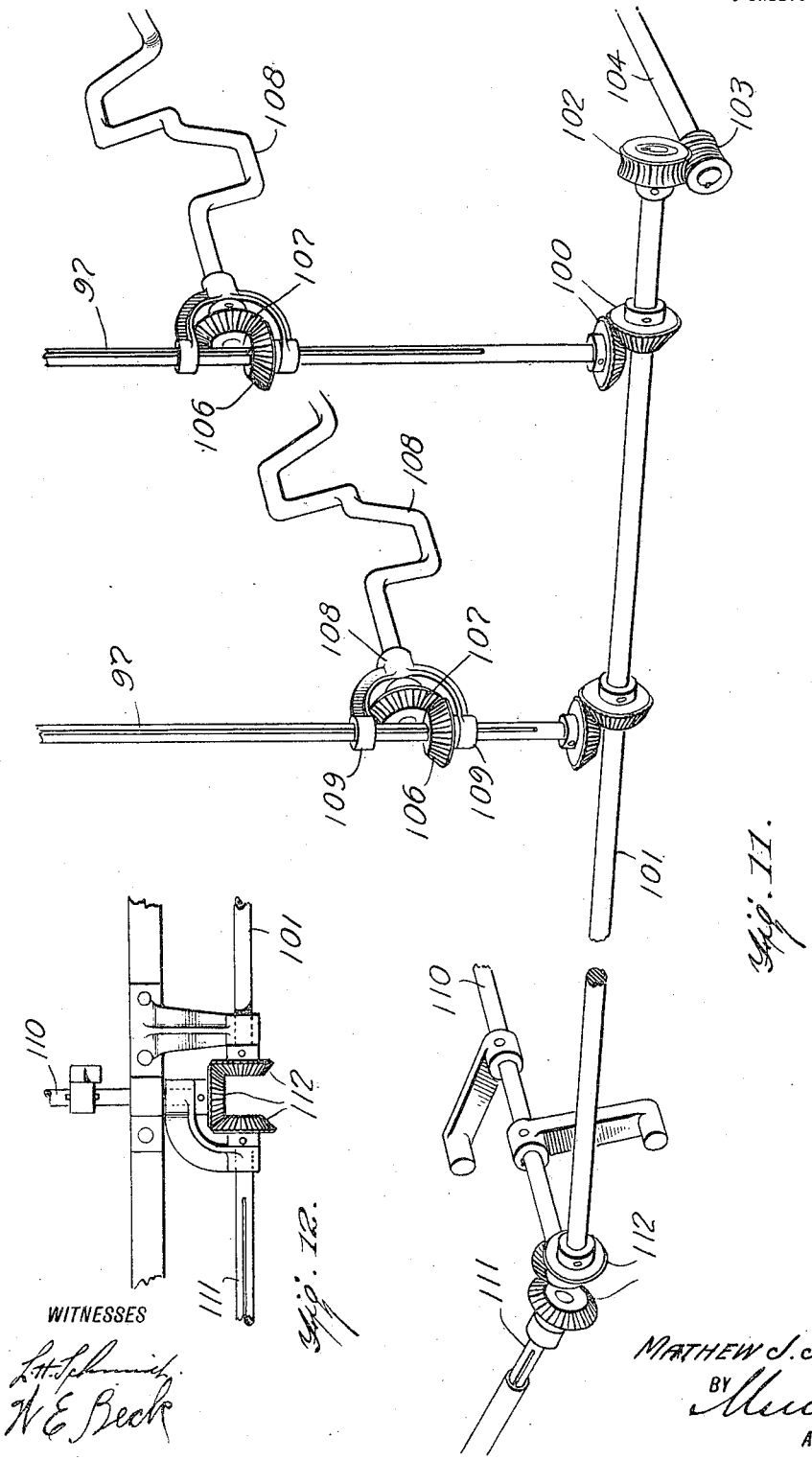

MATHEW J. JACOBS, OF CLEAR WATER, MINNESOTA.

DITCHING-MACHINE.

1,259,746.

Specification of Letters Patent. Patented Mar. 19, 1918.

Application filed July 3, 1917. Serial No. 178,342.

*To all whom it may concern:*

Be it known that I, MATHEW J. JACOBS, a citizen of the United States, and a resident of Clear Water, in the county of Wright and State of Minnesota, have invented certain new and useful Improvements in Ditching-Machines, of which the following is a specification.

My invention is an improvement in ditching machines, and has for its object to provide a machine of the character specified, wherein mechanism is provided for first spading the ground to loosen the same, and wherein other mechanism is provided for removing the loosened soil from the ditch.

In the drawings:

Figure 1 is a side view of the improved ditching machine;

Fig. 2 is a rear view of the delivery chute;

Fig. 3 is a longitudinal section;

Fig. 4 is a section on the line 4—4 of Fig. 1;

Fig. 5 is a section on the line 5—5 of Fig. 1, both views looking in the direction of the arrows adjacent to the line;

Fig. 6 is a section on the line 6—6 of Fig. 3, looking in the direction of the arrows adjacent the line;

Fig. 7 is a detail side view showing the counter-balancing mechanism;

Fig. 8 is a section on the line 8—8 of Fig. 7;

Fig. 9 is a perspective view of the sliding block or carriage for supporting the spade controlling shafts;

Fig. 10 is a side view showing a modified construction of drive gear;

Fig. 11 is a perspective view of the driving gear detached;

Fig. 12 is a top plan view of a portion of Fig. 11.

In the present embodiment of the invention, a substantially rectangular supporting frame 1 is provided, in the present instance consisting of channel material, and the frame is supported by pairs 2 and 3 of front and rear wheels, power wheels 4, and a caster wheel 5, the wheels 2, 3 and 4 being intermediate the ends of the frame, while the wheel 5 is at the front of the frame. The caster wheel 5 is connected to the frame by a rotatably mounted yoke 6, the wheel being journaled between the arms of the yoke, while the yoke is journaled on the body.

The wheels 2, 3 and 4 are secured to axles 7, 8 and 9, respectively, the axle 8 being journaled on the frame 1, while the axles 7 and 9 are journaled at the ends of supporting bars 10, which have bearings 11 intermediate their ends engaging the axle 8. The wheels 2, 3 and 4 at each side of the frame are outside of the frame, and an endless belt 11 is mounted upon the said wheels at each side of the frame, the said belt forming a trackway for the wheels.

A motor 12, in the present instance an internal combustion engine, is arranged at the front of the frame, and the shaft of the motor is provided with a sprocket wheel 13, which is connected by means of a sprocket chain 14 with a sprocket wheel 15 on a driving shaft 16 journaled in bearings 17 transversely of the frame. The shaft 15 has oppositely arranged friction disks 18 and 18ª, and these disks are adapted to be engaged by a friction wheel 19 on one of the sections 20 of a sectional transmission shaft. This disk 19 is mounted to slide longitudinally of the section 20, being feathered thereon, and the forward end of the section is supported by a sleeve 21 mounted to slide on the axle 16.

The shaft section is connected to the rear section 22 of the transmission shaft by means of a universal joint, as shown in Fig. 4, and the said rear section is journaled in a bearing 23 on the frame, and in a bearing bracket 24 mounted on the axle 8 and in which the axle is rotatable. The section 22 has a worm 25 at the axle, and this worm engages a worm wheel 26 on the axle. It will be obvious that when the friction wheel 19 is in engagement with either disk 18 or 18ª the transmission shaft will be rotated, and will drive the axle to move the machine forwardly or rearwardly, as the case may be, and the wheels 2, 3 and 4 will travel on the endless belt which forms a trackway for the said wheels. The shaft section 20 is swung to cause the wheel 19 to engage either disk 18 or 18ª by means of a lever 26 which is pivoted to the frame, and is connected to the shaft by a link 27, the said link engaging a collar 28 journaled on the shaft. The lever has latch mechanism which coöperates with a toothed segment 29 to hold the lever in adjusted position. The wheel 19 is, as before stated, mounted to move longitudinally of the shaft section 20, to provide a variable speed mechanism, and the wheel is moved by means of a lever 30 which is pivoted to a bracket 31 having a toothed sector with which latch mechanism on the lever coöperates to hold the lever in adjusted position. The lever is connected to a collar 32 mounted to rotate on the hub of the wheel, by means of a yoke 43, the arms of the yoke extending above and below the shaft 16.

The spading mechanism is supported by front and rear pairs of hollow standards 33 and 34, the members of the pairs being in alinement transversely of the frame. Slides or carriages 35 are mounted for vertical movement in the standards, each carriage having at its lower end a bearing 36 and at its upper end a bearing 37, and the said bearings are connected to the carriages by webs, which extend through slots 38 in the front and rear faces of the standards.

A lever supporting shaft 39 is journaled in each of the bearings 37, and a crank shaft 40 is journaled in each of the bearings 36. Levers 41 are journaled on the shaft 39 of the forward standards intermediate the ends of the levers, and similar levers 42 are journaled on the shaft 39 of the rear standards. Each lever of each series is connected to a crank on one of the crank shafts by means of a link 43, so that the levers will be vibrated when the crank shafts are rotated.

Spades 44 and 45 are connected with the rear ends of the levers, the spades 44 being connected with the levers of the forward standards, while the spades 45 are connected with the levers of the rear standards. These spades depend from the ends of the levers, and it will be evident that when the shafts 40 are rotated the spades will be reciprocated to cut into the earth.

The slides or carriages 35 are, as before stated, mounted to move vertically in the standards, and each shaft 39 is provided with a pinion 46 which engages a rack bar 47 mounted on the standards. It will be evident that when, for any reason, the spades meet with an obstruction, the shaft 39 to which the spades are connected, together with its carriage, will be moved vertically, the pinion rolling on the rack bar. The shaft 40 pertaining thereto will also be raised, and counter-balancing mechanism is connected with the shafts for returning them to original position. The said counter-balancing mechanism comprises a weight 48 which is connected to one end of a cord 49, and the other end of the cord winds upon a wheel 50 secured to the shaft 39. When the shaft moves upwardly and is rotated by the engagement of the pinion with the rack bar the cord 49 will be wound up, and the weight will be lifted. The weight tends to move the shaft in an opposite direction, and it will be evident that the weight at all times tends to force the spades into the ground and to assist in the digging operation.

The shaft 40 of the forward standards is provided with a worm wheel 51 which is engaged by a worm 52 on the rear section of a telescoping shaft 53. This shaft is provided at its forward end with a worm wheel 54, which meshes with a worm 55 on the motor shaft. The telescoping shaft 53 is supported by yoke shaped brackets 56 mounted on the motor shaft and on the shaft 40, respectively.

The shaft 40 of the rear standards is driven by a telescoping shaft 57, which is provided at its ends with bevel gears 58 meshing with gears 59 on the shafts 40. The bevel gear 59 of the shaft 40 of the rear standards is also engaged by a bevel gear 60 on the forward end of a telescoping shaft 61 which is provided at its rear end with a bevel gear 62 meshing with a bevel gear 63 on a shaft 64 journaled transversely of the frame and provided with a series of radial arms 65. This shaft 61 is supported by bearing brackets 66 mounted on the shafts 64 and 40 of the rear standards, and the shaft 57 is supported by similar brackets.

A series of bell cranks 67 is mounted on a shaft 68 arranged transversely of the frame which is in front of the shaft 64, and one arm of each of these levers is adapted for engagement by one of the radial arms 65 of the shaft 64. The other arm of each bell crank is connected to a pair of spades, that is, to one spade of the front series and one spade of the rear series, by means of a chain 69 and a spring 70. A stop bar 71 is arranged in front of the bell cranks for limiting their forward movement, and it will be evident that when one of the radial arms 65 engages the rear arm of a bell crank, the bell crank will be swung in a direction to pull two spades of the two series rearwardly, to loosen the soil already cut.

It will be noticed upon an inspection of Fig. 3 that the spades of the rear series cut at a lower level than the spades of the forward series, the spades of the forward series cutting a certain depth and the spades of the rear series completing the ditch with the next cut.

A pair of rolling colters 72 is arranged just in front of the front series of spades, the said colters being spaced apart the width of the ditch desired, and each colter is journaled in the lower end of an arm 73. These arms 73 are pivoted to the frame, as indicated at 74, and they are normally pressed downward into engagement with the soil by means of coil springs 75. These springs are arranged on rods 76 which are pivoted to the arms 73 at their lower ends, and move through guides 77 on the frame at the upper end. The springs are arranged between the guides and stops 78 on the rods. The colters cut through the top soil, to separate grass and the like, so that the ditch will have smooth walls at the top, and the strain on the spades will be lessened.

The loosened soil is removed from the ditch by means of an endless carrier consisting of a supporting frame 79 in which is mounted an endless apron 80 having blades or vanes 81. This apron runs over rollers 82 at the ends of the supporting frame, and the frame is slidably connected with the frame 1, by means of a shaft 82. This shaft extends transversely of the frame 1 in longitudinally extending slots 83, and transversely of the frame 79 in longitudinally extending slots 84. Thus the shaft 82 will move longitudinally of the frame 1 or of the frame 79.

The lower end of the supporting frame is supported by chains 85 which wind upon a reel 86 journaled on the main frame, and having a crank 87 for operating the same. Pawl and ratchet mechanism 88 is provided for preventing reverse rotation of the shaft. The rear roller 82 of the conveyer is driven by means of a telescoping shaft 85 which is provided at its ends with bevel gears 86 meshing with the bevel gear 63 before mentioned and with a bevel gear 87 on the roller 82. This shaft is supported by bearings 88 on the frames 1 and 79, and the upper run of the carrier is moved in a direction to carry the soil displaced by the spades upwardly and rearwardly, and the conveyer delivers to an inclined discharge chute 89, which delivers the soil at one side of the ditch. This chute is supported by the rear end of the main frame 1, as shown in Fig. 2.

The front or lower end of the frame 79 has a species of scoop 90 for scooping up the dirt and delivering it to the endless conveyer, and it will be noticed that the vanes 81 curve upwardly and rearwardly on the upper run of the conveyer.

In operation, the machine is drawn along the line of the ditch, moving on the belts 11 which form trackways for the wheels 2, 3 and 4. The rolling colters 72 outline the ditch, cutting through the top layer of soil, sod and the like. The front series of spades cut half the depth of the ditch, each spade being pushed downwardly into the ground, and then drawn rearwardly to loosen the slice of soil cut by the spade, the second series cutting the bottom of the ditch and throwing the soil rearwardly, where it is picked up and removed by the conveyer. It is obvious that any number of series of spades may be used, depending upon the depth of the ditch.

It will be noticed from an inspection of Fig. 6 that there are three spades in each series, and that the wheels 4 are hollow. Means is also provided for clutching the wheels to the axle 8, the said wheels being loosely journaled upon the axle. The clutching means comprises cone shaped disks 91, which are adapted to engage with their convex faces the concaved surfaces of other disks 92 secured to the wheels 4. These disks 91 are feathered on the axle, and they are moved into and out of engagement with the disks 92 by means of levers 93, which are pivoted to toothed brackets 94 on the frame, and each lever has latch mechanism 95 for coöperating with the segments. It will be noticed that the teeth of the segments are ratchet teeth, so arranged that the latch mechanism will slip idly over the teeth as the upper end of the lever is moved inwardly, that is, in a direction to engage the clutch, but will prevent movement in the opposite direction.

In the embodiment of the invention shown in Figs. 10, 11 and 12, the ditching machine 96 is similar to that shown in Figs. 1 to 9, with the exception of the driving mechanism. In this construction shafts 97 are journaled in vertical position on the standards 98 corresponding to the standards 33 and 34 of Fig. 1. These shafts are held in bearing brackets 99 on the standards, and each is connected at its lower end by bevel gearing 100 with the driving shaft 101 journaled longitudinally on the frame. This shaft has a worm gear 102 at its forward end which meshes with a worm 103 on a shaft 104 journaled transversely of the frame and driven by a sprocket chain from the motor 105. Bevel gears 106 are mounted to slide vertically on the shafts 97 and these bevel gears mesh with gears 107 on the crank shafts 108 which operate the levers. Each of the crank shafts is journaled at the end adjacent to the bevel gear 107 in the body 108 of a yoke, whose arms have bearings 109 slidably engaging the adjacent shaft. Each bevel gear 106 is keyed to the shaft and since the bevel gear is above the lower arm of the yoke it is obvious that the bevel gear will move with the yoke and the crank shaft. At its rear end the shaft 101 is geared to the cam operating shaft 110 and to the operating shaft for the conveyer 111, by the bevel gear connection indicated at 112. The operation of the construction shown in Figs. 10 to 12 is precisely the same as that shown in Figs. 1 to 9.

I claim:

1. A ditching machine comprising a wheel supported frame, a series of spades in connection with the frame, the members of the series being arranged transversely of the frame, a pair of hollow standards on the frame, the members of the pair having front and rear slots, a carriage mounted to slide in the standards and having bearings extending through the slots at the upper and lower ends of the carriage, a shaft journaled in the upper bearing in rear of the standard, a crank shaft journaled in the lower bearing in front of the standard, levers pivoted to the first named shaft, the spades being connected to the rear ends of the levers, a link connecting the front end of each lever with a crank of the crank shaft, means for operating the crank shaft, means for swinging the spades rearwardly at their lower ends when they are in lowermost position, and a counter-balancing mechanism for normally retaining the carriages at their lowermost position.

2. A ditching machine comprising a wheel supported frame, a series of spades in connection with the frame, the members of the series being arranged transversely of the frame, a pair of hollow standards on the frame, the members of the pair having front and rear slots, a carriage mounted to slide in the standards and having bearings extending through the slots at the upper and lower ends of the carriage, a shaft journaled in the upper bearing in rear of the standard, a crank shaft journaled in the lower bearing in front of the standard, levers pivoted to the first named shaft, the spades being connected to the rear ends of the levers, a link connecting the front end of each lever with a crank of the crank shaft, means for operating the crank shafts, means for swinging the spades rearwardly at their lower ends when they are in lowermost position, and a counter-balancing mechanism for normally retaining the carriages at their lowermost position.

3. A ditching machine comprising a supporting frame, front and rear shafts journaled on the frame and mounted to move vertically with respect thereto, a series of levers journaled on each shaft, a spade depending from the rear end of each lever, the rearmost spades cutting at a deeper level than the foremost, means connected with the front ends of each series of levers for swinging the levers to operate the spades and movable with the levers, counter-balancing mechanism connected with the shafts for normally holding them in lowermost position, and means for swinging each spade rearwardly at its lower end when in its lowermost position.

4. A ditching machine comprising a supporting frame, a shaft journaled on the frame and mounted to move with respect thereto, a series of levers journaled on the shaft, a spade depending from one end of each lever, means connected with the other ends of the levers for swinging the levers to operate the spades, counter-balancing mechanism connected with the shaft for normally holding it in lowermost position, and means for swinging each spade rearwardly at its lower end when in its lowermost position.

5. A ditching machine comprising a supporting frame, a pair of standards on the frame, a carriage mounted for vertical movement on each standard, a shaft supported by the carriages and having digging spades, the shaft being mounted to move vertically to permit the spades to yield upward, pinions on the ends of the shafts, and fixed rack bars on the standards for engagement by the pinions to cause the shaft to rotate when it moves upwardly, a wheel in connection with the shaft, a counterweight, and a flexible connection for the counterweight winding on the wheel.

6. A ditching machine comprising a supporting frame, a series of digging spades arranged transversely of the frame and mounted to move vertically, means connected with the spades for swinging them rearwardly at their lower ends when in lowermost position, said means comprising a series of bell cranks journaled on the frame, one arm of each crank being connected to a spade, and cams engaging the other arms for swinging the bell cranks.

7. A ditching machine comprising a supporting frame, a series of digging spades arranged transversely of the frame and mounted to move vertically, means connected with the spades for swinging them rearwardly at their lower ends when in lowermost position, said means comprising a series of bell cranks journaled on the frame, one arm of each crank being connected to a spade, and cams engaging the other arms for swinging the bell cranks, the connection between the bell cranks and the spades being a yielding and flexible connection.

8. A ditching machine comprising a supporting frame, a series of digging spades arranged transversely of the frame and mounted to move vertically, means connected with the spades for swinging them rearwardly at their lower ends when in lowermost position, said means comprising a series of bell cranks journaled on the frame, one arm of each crank being connected to a spade, and cams engaging the other arms for swinging the bell cranks, the connection between the bell cranks being a yielding connection.

MATHEW J. JACOBS.

Witnesses:
GEO. J. MEINZ,
WALTER ZAPP.

Copies of this patent may be obtained for five cents each, by addressing the "Commissioner of Patents, Washington, D. C."